United States Patent
Desai et al.

(10) Patent No.: US 6,241,392 B1
(45) Date of Patent: Jun. 5, 2001

(54) HYBRID BEARING

(75) Inventors: Mihir C. Desai, Yorba Linda, CA (US); Raymond D. Zagranski, Sommers, CT (US)

(73) Assignee: Coltec Industries Inc, Charlotte, NC (US)

( * ) Notice: Subject to any disclaimer, the term of this patent is extended or adjusted under 35 U.S.C. 154(b) by 0 days.

(21) Appl. No.: 09/489,747

(22) Filed: Jan. 21, 2000

(51) Int. Cl.[7] .................................................. F16C 32/06
(52) U.S. Cl. ............................ 384/100; 384/114; 384/118
(58) Field of Search ..................... 384/100, 114, 384/118, 120, 291; 415/111; 417/204; 418/268

(56) References Cited

U.S. PATENT DOCUMENTS

| | | | |
|---|---|---|---|
| 3,079,203 | * 2/1963 | Whitley et al. | 384/118 |
| 3,642,331 | 2/1972 | Silver | 384/102 |
| 3,708,215 | 1/1973 | Wilcock et al. | 384/102 |
| 3,854,781 | 12/1974 | Bildtsen | 384/102 |
| 4,090,743 | 5/1978 | Suzuki et al. | 384/113 |
| 4,159,152 | * 6/1979 | Bjork | 384/291 |
| 4,185,878 | 1/1980 | Robert | 384/120 |
| 4,597,676 | 7/1986 | Vohr et al. | 384/114 |
| 4,684,318 | 8/1987 | Mulders | 415/113 |
| 4,989,997 | * 2/1991 | Yoshimura | 384/100 |
| 5,480,234 | * 1/1996 | Chen et al. | 384/313 |
| 5,482,308 | 1/1996 | Corratti et al. | 384/311 |
| 5,503,478 | * 4/1996 | Blaine | 384/100 |
| 5,545,014 | 8/1996 | Sundberg et al. | 417/204 |
| 5,720,558 | 2/1998 | Edney et al. | 384/309 |
| 5,871,285 | 2/1999 | Wasson | 384/118 |

* cited by examiner

Primary Examiner—Thomas R. Hannon
(74) Attorney, Agent, or Firm—Cummings & Lockwood

(57) ABSTRACT

A bearing for supporting a rotating shaft receiving a transverse load, wherein the bearing supports the shaft along a load line and wherein the bearing is closest to the rotating shaft at a running line. The bearing includes a circumferential inner surface, and a lubricant bay defined in the inner surface. The lubricant bay is axially and circumferentially offset from the load line such that a resulting pressure pad of lubricant within the bay provides a hydrostatic force that forces the running line to a location substantially perpendicular to the load line. Load capabilities of a bearing according to the present disclosure, therefore, are substantially insensitive to shaft bending and do not deteriorate in response to the shaft bending.

19 Claims, 3 Drawing Sheets

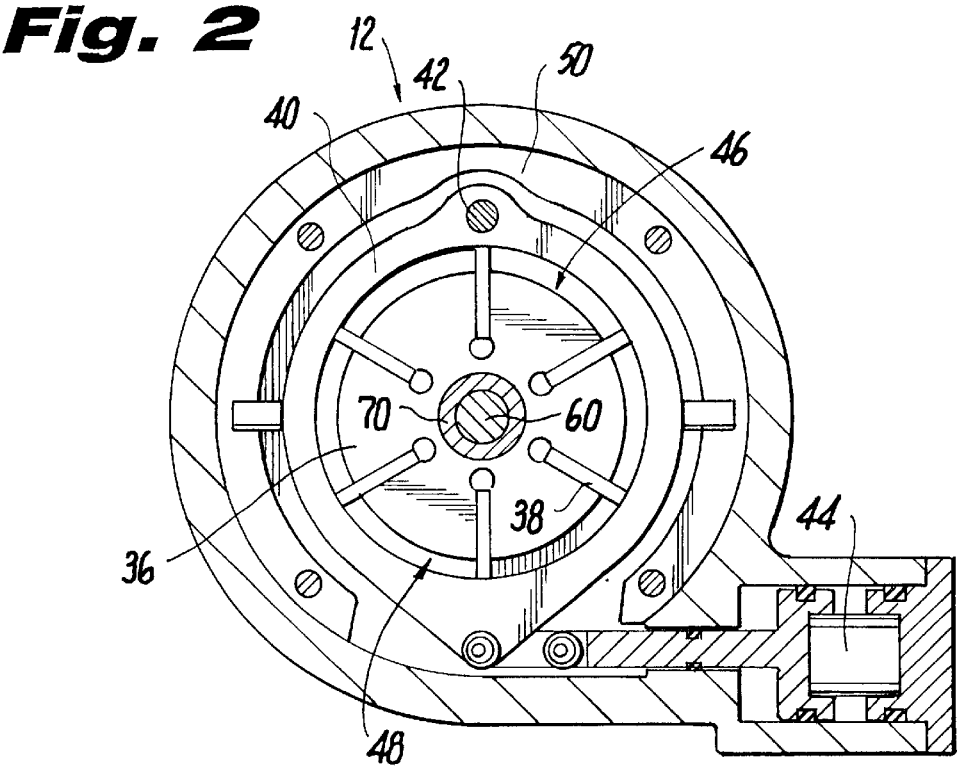
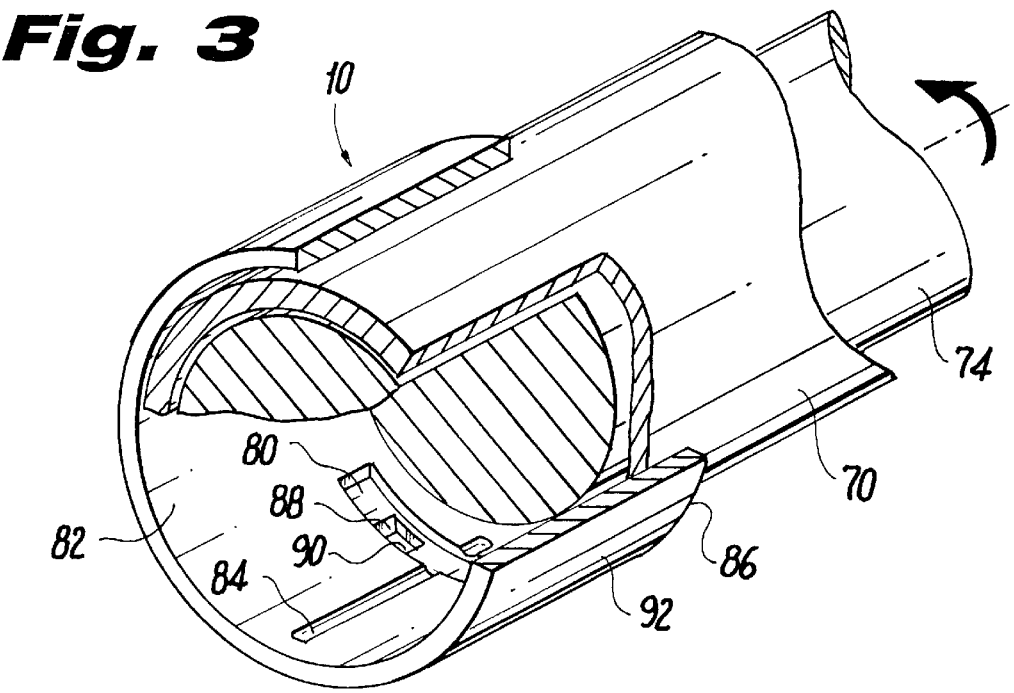

HYBRID BEARING

BACKGROUND OF THE DISCLOSURE

1. Field of the Disclosure

The present disclosure generally relates to bearings, and, more particularly, to hydrostatic and hydrodynamic bearings which use static lubricant pads and a thin film of lubricant, respectively, to support a rotating shaft. Even more particularly, the present disclosure relates to a hybrid bearing having both hydrostatic and hydrodynamic components, where the hydrostatic component is arranged such that the bearing is substantially insensitive to the bending of a rotating shaft supported thereby.

2. Description of the Related Art

Hybrid bearings have been widely used in many applications ranging from machine tool spindles to high-speed turbo machinery, wherein the shafts supported by such bearings are rotated at high speeds. A hybrid bearing is shown and described, for example, in U.S. Pat. No. 5,871,285.

In many bearing applications, a transverse load (in addition to any gravitational effects on the shaft) is applied to the rotating shaft supported by the bearing, thereby resulting in bending or deflection of the shaft. The rotating shaft of a variable displacement vane pump, for example, is subjected to bending. As is known, a vane pump generally includes a rotor having a plurality of radially extending vane slots, a plurality of vane elements slidably-received within the vane slots of the rotor for radial movement therewithin, and a cam having an interior surface coaxially surrounding the rotor so that outer tips of the vane elements contact the interior cam surface during rotation of the rotor. The cam can be pivoted relative to the rotor to charge the extent of eccentricity therebetween and vary the displacement of the vane pump. A variable displacement vane pump utilizing hybrid bearings is shown, for example, in U.S. Pat. No. 5,545,014.

In a single acting vane pump (one inlet and one outlet), a cavity is formed between the cam and the rotor and includes opposing low pressure and high pressure sides. The pump also includes a housing containing the rotor and the cam and having an inlet communicating with the low pressure side and an outlet communicating with the high pressure side. A rotatable shaft coaxially supports the rotor, and the bearings are received in the housing and coaxially support the rotatable shaft. Since the shaft rotates between opposing low pressure and high pressure sides of the vane pump, a transverse load acts on the rotating shaft, causing the shaft to bend or deflect.

Accordingly, there is a need for a new and improved bearing that can be used to achieve higher rotating shaft loads so that machines incorporating such bearing can be built with reduced size and weight, yet provide efficiencies. More particularly, there is a need for a bearing having an increased load carrying capability. Even more particularly, there is a need for a bearing that is substantially insensitive to shaft misalignment caused by deflection of the shaft at increased transverse loads.

SUMMARY OF THE DISCLOSURE

The present disclosure provides a bearing for supporting a rotating shaft receiving a transverse load, wherein the bearing supports the shaft along a load line (defined as the direction of force transmitted by the shaft on the bearing) and wherein the bearing is closest to the rotating shaft at a running line (defined as the closest point between the rotating shaft and he bearing). The bearing includes a circumferential inner surface within which a lubricant bay is formed. The lubricant bay is dimensioned and configured such that pressurized lubricant contained therein provides a hydrostatic force against the shaft. In addition, the lubricant bay is axially and circumferentially offset from the load line such that the hydrostatic force generated thereby forces or shifts the running line to a location that is substantially perpendicular to the load line, whereby the bearing is substantially insensitive to shaft bending or deflection.

According to one aspect of the present disclosure, a floor of the lubricant bay includes a recess, such that the hydrostatic force of the bearing is more precisely directed against the shaft. According to another aspect of the present disclosure, the bearing includes a lubricant groove on the inner surface thereof for providing a thin hydrodynamic film of lubricant between the rotating shaft and the inner surface of the bearing. According to an additional aspect of the present disclosure, the bearing also includes a supply port extending from an outer surface of the bearing to the recess in the lubricant bay for supplying high pressure lubricant to the bay, the recess and the groove.

Further features of the bearing of the present disclosure will become more readily apparent to those having ordinary skill in the art to which the present disclosure relates from the following detailed description and attached drawings.

BRIEF DESCRIPTION OF THE DRAWINGS

So that those having ordinary skill in the art will more readily understand how to provide a bearing in accordance with the present disclosure, a preferred embodiment of the bearing is described in detail below with reference to the drawings wherein:

FIG. 2 is a sectional view of the pump, taken along line 2/2 of FIG. 1;

FIG. 3 is a partial isometric view of the bearing of FIG. 1 supporting the rotatable shaft which, for purposes of clarity, has an exaggerated running clearance between the shaft and the bearing and a section of the shaft is cut away to reveal an inner surface of the bearing, and wherein the shaft is shown rotating with respect to the bearing in a counter-clockwise direction;

DETAILED DESCRIPTION OF THE PREFERRED EMBODIMENTS

Figure 1:
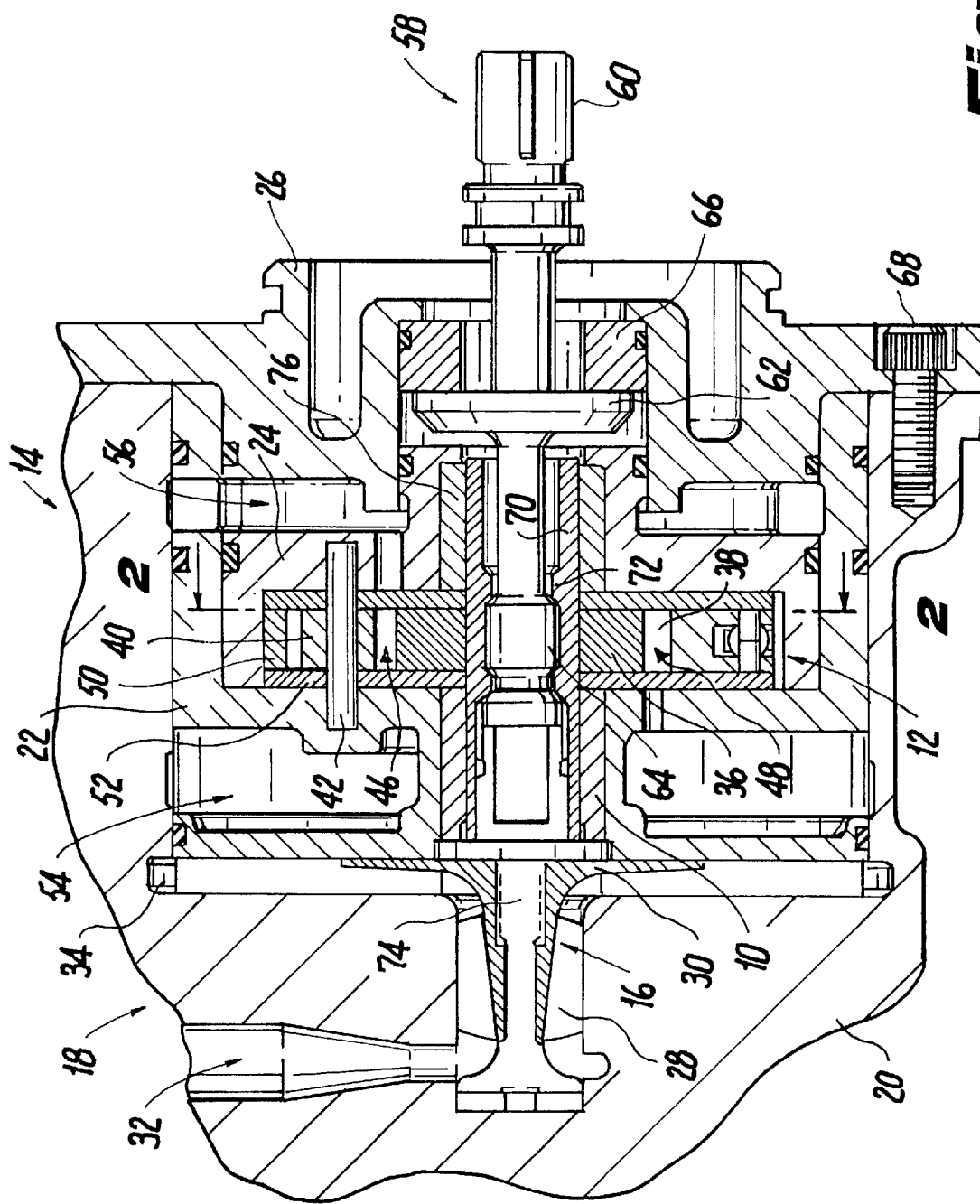
FIG. 1 is side elevational view of a portion, partially in section, of a pump incorporating a bearing according to the present disclosure for supporting a rotatable shaft.

Referring to FIGS. 1 through 5, the present disclosure provides a bearing 10 configured to support a shaft 70 rotating under a transverse or radial load. The bearing 10 is substantially insensitive to shaft misalignment caused by bending of the shaft at increased transverse loads, such that the load carrying capability of the bearing does not deteriorate at higher loads. While the bearing 10 disclosed herein is useful for any application where a transverse load is applied to a rotating shaft, a bearing according to the present disclosure is particularly useful for supporting a shaft of a variable displacement vane pump, where the shaft operates between radially opposed low and high pressure zones.

1. The Variable Displacement Vane Pump

A variable displacement vane pump 12, for example, can be incorporated in a fuel entering unit 14, as shown in FIGS.

1 and 2. Such a fuel metering unit 14 is used to supply ressurized fuel to a gas turbine engine. A similar fuel metering unit is shown and described in greater detail, for example, in U.S. Pat. No. 5,545,014, the disclosure of which is incorporated herein by reference in its entirety.

In general, the fuel metering unit 14 includes a boost pump 16 for pressurizing fuel supplied to the vane pump 12, and a housing 18 having four sections 20, 22, 24, 26 that fit together to enclose the boost pump 16 and the vane pump 12. The boost pump 16 is substantially contained between the first and the second housing sections 20, 22 and includes an axial inducer 28 and an impeller 30. A pump inlet 32, for providing fuel to the axial inducer 28, is defined by the first housing section 20, and a collector area 34, for receiving charged fuel from the impeller 30, is defined by the first and the second housing sections 20, 22.

The vane pump 12 is substantially contained between the second and the third housing sections 22, 24 and includes a rotor 36 having a plurality of vane elements 38 radially-supported within vane slots of the rotor. The outer tips of the vane elements 38 contact an interior surface of a cam 40 coaxially surrounding the rotor 36. The cam 40 pivots on a pin 42 supported between the second and third housing sections 22, 24, and a piston 44, which is controlled by an engine controller (not shown), for example, adjusts the cam displacement and, thus, the pump output.

With continuing reference to FIGS. 1 and 2, the cavity formed between the cam 40 and the rotor 36 includes a high pressure zone 46 and a low pressure zone 48. The vane elements 38 transfer fuel from the low pressure zone 48 to the high pressure zone 46 as the rotor 36 turns. The vane pump 12 also includes a circumferential spacer 50 and end plates 52 which help seal the cavity between the rotor and the cam. The second housing section 22 defines a vane inlet 54 to the low pressure zone 48 of the vane pump 12. The vane inlet 54 is connected to the collector 34 of the boost pump 16 by a diffuser (not shown). A vane outlet 56, which is defined by the third housing section 24, communicates with the high pressure zone 46 of the vane pump 12.

Power to drive the fuel metering unit 14 is supplied by an engine (not shown) incorporating the unit, through a primary drive shaft 58. The primary drive shaft 58 includes a first male spline 60, a radially extending rim 62, and a second male spline 64. The rim 62 of the shaft 58 is engaged by a shaft seal 66 and the fourth housing section 26 to retain the shaft 58 within the housing 18. As shown, the housing 18 is secured together with fasteners 68, for example.

A sleeve 70 is coaxially received on the primary drive shaft 58 and includes a first female spline 72 which engages the second male spline 64 of the primary drive shaft. As shown, the rotor 36 of the vane pump 12 is coaxially received and secured on an outer surface of the sleeve 70. A secondary drive shaft 74 drives the boost stage 16 from a common spline with the sleeve 70. Normally the first male spline 60 of the primary drive shaft 58 is engaged and driven by a power source of the engine, such as a gear box, so that the boost pump 16 and the vane pump 12 are operated.

A bearing 76 is seated in the third housing section 24 and it receives and supports the sleeve 70 and the primary drive shaft 56. In addition, a bearing 10 constructed according to the present disclosure is seated in the second housing section 22 and it receives and supports the sleeve 70 and the secondary drive shaft 74. Since the shafts 56, 74 and the sleeve 70 rotate between radially opposing low pressure and high pressure sides of the vane pump 12, a transverse or radial load acts on the rotating shafts and sleeve. The bearing 10 according to the present disclosure, however, provides the benefit of being substantially insensitive to shaft misalignment caused by bending of the shaft at increased transverse loads, such that the load carrying capability of the bearing 10 does not deteriorate at higher loads.

2. The Hybrid Bearing

Figure 4:
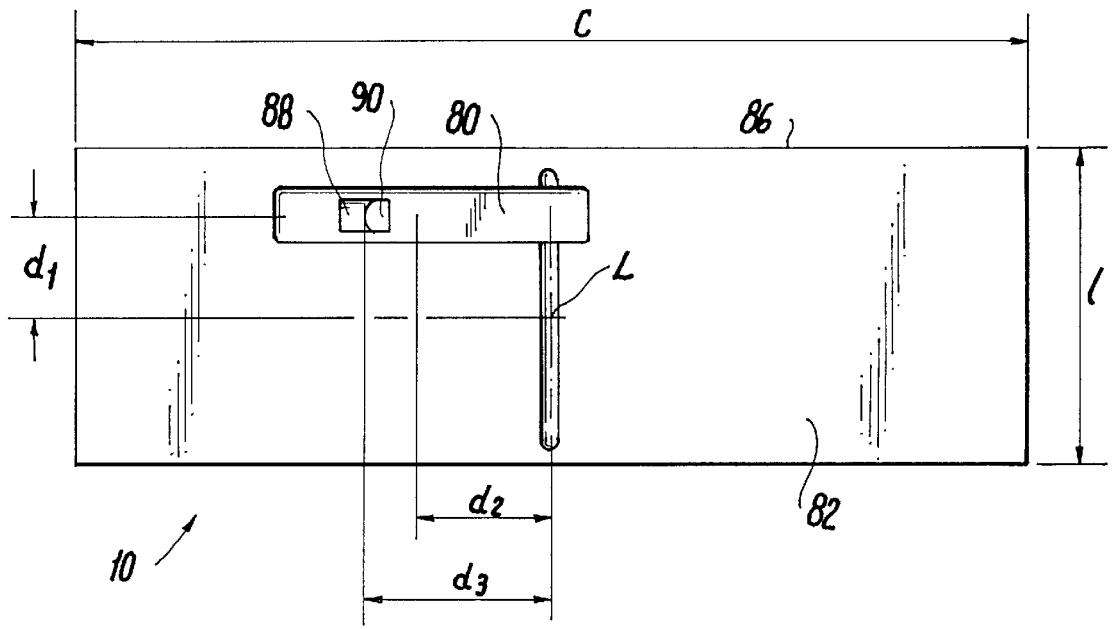
FIG. 4 is a flat projection (unwrapped) of the inner surface the bearing of FIG. 3.

Referring now to FIGS. 3 and 4, the bearing 10 according to the present disclosure is a hybrid bearing of the "fluid film type" that combines hydrodynamic and hydrostatic reaction forces to ensure adequate lubrication and load carrying capability for the bearing. The hydrostatic reaction force is primarily generated by a lubricant bay 80 formed in a circumferential inner surface 82 of the bearing 10, while the hydrodynamic reaction force is primarily generated by a lubricant distribution groove 84 formed in the inner surface 82 of the bearing 10.

The hydrostatic bay 80 in the inner surface 82 of the bearing 10 allows the pressurized lubricant to collect therein and remain relatively stationary with respect to the rotating shaft 70, such that the lubricant forms a "pressure pad" that supports the rotating shaft 70. While the bay 80 primarily provides a hydrostatic force, it also provides some hydrodynamic force by contributing somewhat to a thin film of lubricant that moves with the rotating shaft 70 between the shaft and the bearing 10.

As best seen in FIG. 4, the lubricant bay 80 is axially offset from a load line "L" (defined herein as a direction of the force transmitted by the shaft 70 on the bearing 10) by a predetermined distance "d1" . In particular, the lubricant bay 80 is axially offset towards the outboard side 86 (i.e., away from the vane pump) of the bearing 10. In addition, the lubricant bay 80 is circumferentially offset from the load line "L" by a predetermined distance "d2". In particular, the lubricant bay 80 is circumferentially offset from the load line "L" in a direction opposite the direction of shaft rotation. The hydrostatic lubricant bay 80 is generally rectangular and transversely oriented with respect to the bearing 10.

Preferably, a floor of the bay 80 includes a recess 88 wherein the hydrostatic force generated by the bay is strongest and more precisely directed against the shaft 70. As shown, the recess 88 is equally offset in an axial direction from the load line "L" with respect to the lubricant bay 80, but is offset more than the bay in a circumferential direction. In particular, the recess 88 is circumferentially offset from the load line "L" by a predetermined distance "d3".

The hydrodynamic force is primarily provided by the elongated groove 84, which has a depth and a width that are both less than the depth and the width of the hydrostatic bay 80. However, the elongated groove 84 does contribute somewhat to the hydrostatic force. As shown, the hydrodynamic lubricant groove 84 is elongated, intersects the bay 80, and is axially oriented with respect to the bearing 10. Thus, the lubricant groove 84 is perpendicular to the lubricant bay 80. As shown, the lubricant groove 84 is aligned with the load line "L". It should be noted, however, that a hybrid bearing made in accordance with the present disclosure could have a lubricant groove offset from the load line "L".

Figure 5:
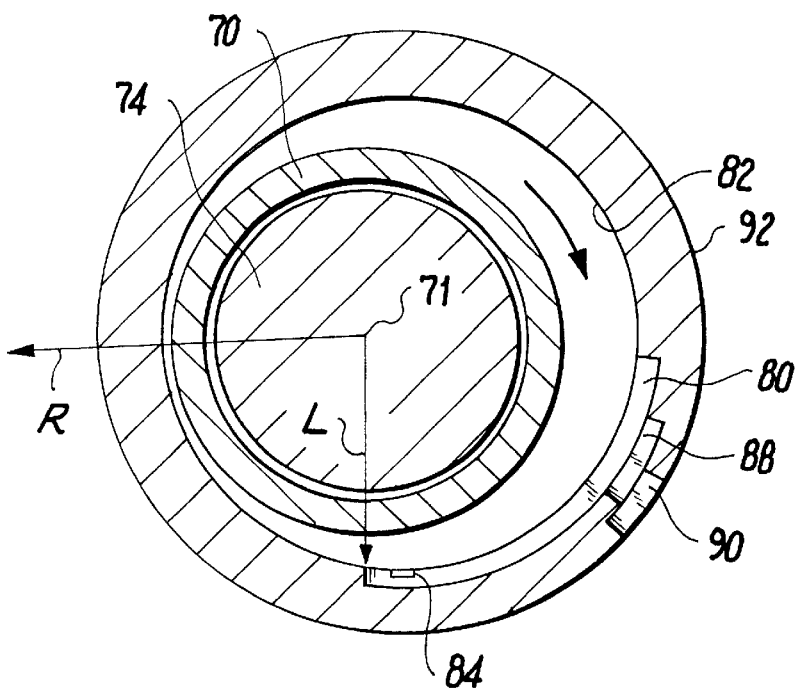
FIG. 5 is an end view of the bearing and the shaft of FIG. 3.

A supply port 90 extends from an outer surface 92 of the bearing 10 to the recess 88 and the bay 80 to supply lubricant, which is provided under high pressure, to both the bay 80, the recess 88, and the groove 84. Although not shown, the fuel metering unit 14 includes passages for connecting the supply port 90 of the bearing 10 to the high pressure side 46 of the vane pump 12. In addition, as best shown in FIG. 5, the supply port 90 is provided with an opening at the recess 88 which is smaller than an opening of the port at the outer surface 92 if the bearing, such that the pressure of the fuel passing therethrough will increase. Although not shown, the bearing 10 receives fuel lubricant and cooling flow through minute clearances between the shaft 70 and the bearing 10.

Referring to FIG. 4, the hybrid bearing 10 has an inner circumference "c" and a length "1". As an example of a hybrid bearing 10 made in accordance with the present disclosure, the bearing is provided with an inner circumference "c" equal to about 8.98 inches and a length "1" equal to about 2.0 inches; the lubricant bay 80 is axially offset from the load line "L" by a predetermined distance "d1" equal to about 0.4 inches and is circumferentially offset from the load line "L" by a predetermined distance "d2" equal to about 0.64 inches; and the recess 88 is circumferentially offset from the load line "L" by a predetermined distance "d3" equal to about 1.0 inches. It should be noted that these specific dimensions of a hybrid bearing 10 according to the present disclosure are given only as an example and are not meant to be limiting, as a hybrid bearing according to the present disclosure can be provided with other suitable dimensions.

The bearing 10 according to the present disclosure is designed for rugged, infinite life operation, and can be made of a ductile leaded bronze alloy or a suitable equivalent. The bearing end faces and inner surface are also preferably treated with indium plating and dry film lubricants.

3. Operation

FIG. 5 illustrates how the bearing 10 of the present disclosure operates to provide enhanced stability and increased load capability. The interaction between the rotating shaft 70 and the bearing 10 creates the load line "L", and a running line "R". The load line "L" is defined herein as a line "L" radially extending from the axis 71 of the shaft 70 through a point where the shaft 70 is substantially supported by the bearing 10 (i.e., between about 75% to about 85% of the weight of the shaft 70 and load carried thereon). The running line "R" is defined herein as a line "R" radially extending from the axis 71 of the shaft 70 to a point where an outer surface of the shaft 70 is closest to the inner surface 82 of the bearing 10 due to shaft bending (with no bending or deflection of the shaft, the outer surface of the shaft would be equally spaced at all points from the inner surface of the bearing, such than a running line would not exist). When the shaft 70 is not rotating, the running line "R" and the load line "L" converge. As the shaft 70 rotates, however, the running line "R" moves circumferentially away from the load line "L" in the direction of rotation, as the rotating shaft "runs up" the inner surface 82 of the bearing 10.

As is known, shaft bending or deflection occurs mainly in a plane containing the running line "R". It has been found that, as a result of offsetting the lubricant bay 80 axially and circumferentially from the load line "L", the resulting hydrostatic pressure pad of lubricant serves to force or shift the running line "R" further from the load line "L". Thus, a preferred bearing 10, according to the present disclosure, includes a lubricant bay 80 that is both axially and circumferentially offset from the load line "L" such that the resulting pressure pad of lubricant forces the running line "R" substantially perpendicular to the load line "L".

Since the design of the present bearing 10 causes the running line "R" to be substantially perpendicular to the load line "L", the deflection of the shaft does not substantially occur in the plane of the load line "L". Load capabilities of the bearing 10 according to the present disclosure, therefore, are substantially insensitive to shaft 70 bending or deflection, and the load capabilities of the bearing 10 do not deteriorate in response to shaft 70 bending or deflection.

The depth of the bay 80 and the recess 88 are selected, as is known by those skilled in the art of hydrostatic and hydrodynamic bearing 10 design, to be large enough such that the resistance to fluid flow from the bay 80 and the recess 88 allows lubricant to substantially remain therein during operation, to form a static pressure pad. The groove 84, however, is narrower and shallower than the bay 80, so that lubricant will more easily flow from the groove 84 to provide a thin film between the shaft 70 and the bearing 10.

In summary, a bearing is presently disclosed that provides smooth accurate rotary motion of a shaft about an axis, with the shaft kept from making mechanical contact with the bearing by a thin film of pressurized fluid that flows from a groove in the cylindrical inner surface of the bearing. The bearing also uses an innovative method to achieve enhanced stability by orienting a hydrostatic component of the bearing such that the effects of shaft bending on the load capacity of the bearing is substantially eliminated.

It should be understood that the foregoing description is only illustrative of bearings according to the present disclosure. Various alternatives and modifications can be devised by those skilled in the art without departing from the disclosure. Accordingly, the present disclosure is intended to embrace all such alternatives, modifications and variances that fall within the scope of the appended claims.

What is claimed is:

1. A bearing for supporting a rotating shaft receiving a transverse load, wherein the bearing supports the shaft along a load line and wherein the bearing is closest to the rotating shaft at a running line, the bearing comprising:

a circumferential inner surface; and a lubricant bay defined in the inner surface, said lubricant bay axially and circumferentially offset from the load line such that a resulting pressure pad of lubricant within the bay provides a hydrostatic force that forces the running line to a location substantially perpendicular to the load line.

2. The bearing of claim 1, wherein the lubricant bay is axially offset from the load line towards an outboard end of the bearing with respect to the load applied to the rotating shaft.

3. The bearing of claim 1, wherein the lubricant bay is circumferentially offset from the load line in a direction opposite the direction of rotation of the shaft.

4. The bearing of claim 1, wherein the lubricant bay is elongated and transversely oriented with respect to the bearing.

5. The bearing of claim 1, wherein a floor of the lubricant bay includes a recess such that a hydrostatic force created in the bay is strongest at the recess.

6. The bearing of claim 5, wherein the lubricant bay is further circumferentially offset from the load line than the lubricant bay.

7. The bearing of claim 5, further including a supply port extending from an outer surface of the bearing to the recess in the lubricant bay.

8. The bearing of claim 7, wherein the supply port has an opening at the inner surface of the bearing, and an opening at the outer surface of the bearing, and wherein the opening at the inner surface is smaller than the opening at the outer surface.

9. The bearing of claim 1, further comprising a lubricant groove on the inner surface of the bearing for providing a thin hydrodynamic film of lubricant between the rotating shaft and the inner surface of the bearing.

10. The bearing of claim 9, wherein the lubricant groove intersects the lubricant bay.

11. The bearing of claim 9, wherein the lubricant groove is elongated and axially oriented with respect to the bearing.

12. The bearing of claim 9, wherein the lubricant groove is aligned with the load line.

13. A variable displacement vane pump comprising:
   a) a rotor having a plurality of radially extending vane slots;
   b) a plurality of vane elements, each slidably-received within the vane slots of the rotor for radial movement therewithin;
   c) a cam having,
      an interior cam surface coaxially surrounding the rotor so that outer tip surfaces of the vane elements contact the interior cam surface during rotation of the rotor,
      the cam being adjustable relative to the rotor to vary the extent of eccentricity therebetween for varying the displacement capacity of the vane pump,
      a cavity formed between the cam and the rotor including a low pressure zone and a high pressure zone;
   d) a housing containing the rotor and the cam and including an inlet communicating with the low pressure zone and an outlet communicating with the high pressure zone;
   e) a rotatable shaft coaxially supporting the rotor; and
   f) a bearing received in the housing and coaxially supporting the rotatable shaft along a load line and wherein the bearing is closest to the rotating shaft at a running line, the bearing having,
      a circumferential inner surface, and
      a lubricant bay defined by the inner surface, the lubricant bay axially and circumferentially offset from the load line such that a resulting pressure pad of lubricant created within the bay provides a hydrostatic force that pushes the running line to a location substantially perpendicular to the load line.

14. The variable displacement vane pump of claim 13, wherein the lubricant bay of the bearing is axially offset from the load line towards an outboard end of the bearing with respect to the load applied to the rotating shaft.

15. The variable displacement vane pump of claim 13, wherein the lubricant bay of the bearing is circumferentially offset from the load line in a direction opposite the direction of rotation of the shaft.

16. The variable displacement vane pump of claim 13, wherein a floor of the lubricant bay of the bearing includes a recess such that a hydrostatic force created in the bay is strongest at the recess.

17. The variable displacement vane pump of claim 13, wherein the bearing further includes a supply port extending from an outer surface of the bearing to the lubricant bay and wherein the supply port communicates with the high pressure zone of the vane pump.

18. The variable displacement vane pump of claim 13, wherein the bearing further includes a lubricant groove defined by the inner surface of the bearing for providing a thin hydrodynamic film of lubricant between the rotating shaft and the inner surface of the bearing.

19. The variable displacement vane pump of claim 18, wherein the lubricant groove is aligned with the load line.

\* \* \* \* \*